United States Patent [19]

Jones

[11] Patent Number: 4,765,303
[45] Date of Patent: Aug. 23, 1988

[54] GASEOUS FUEL CHARGE FORMING DEVICE FOR INTERNAL COMBUSTION ENGINES

[76] Inventor: James S. Jones, 45 Crown Pl., Richardson, Tex. 75080

[21] Appl. No.: 75,402

[22] Filed: Jul. 20, 1987

[51] Int. Cl.⁴ ............................................. F02B 43/00
[52] U.S. Cl. ..................................... 123/527; 48/180.1
[58] Field of Search ......................... 123/527; 48/180.1

[56] References Cited

U.S. PATENT DOCUMENTS

| | | | |
|---|---|---|---|
| 2,752,758 | 7/1956 | Tann | 123/527 |
| 2,896,599 | 7/1959 | Ensign | 123/527 |
| 3,068,086 | 12/1962 | Ensign et al. | 123/527 |
| 3,960,126 | 6/1976 | Shinoda | 123/527 |
| 4,170,204 | 10/1979 | Bauder | 123/139 AW |
| 4,206,735 | 6/1980 | Miles et al. | 123/139 AW |
| 4,264,537 | 4/1981 | Watanabe et al. | 261/44 C |
| 4,289,106 | 9/1981 | Parietti | 123/527 |
| 4,483,302 | 11/1984 | Mannessen | 123/527 |
| 4,486,360 | 12/1984 | Elias | 261/39 D |
| 4,494,511 | 1/1985 | Ito et al. | 123/463 |

*Primary Examiner*—E. Rollins Cross
*Attorney, Agent, or Firm*—Daniel V. Thompson

[57] ABSTRACT

A device that senses the engine's air demand by reading the change in the air velocity at the venturi and a point up stream of the venturi and uses this negative air pressure signal to provide and control a positive fuel pressure that feeds fuel across a restricting orifice to provide a linear air fuel system.

11 Claims, 1 Drawing Sheet

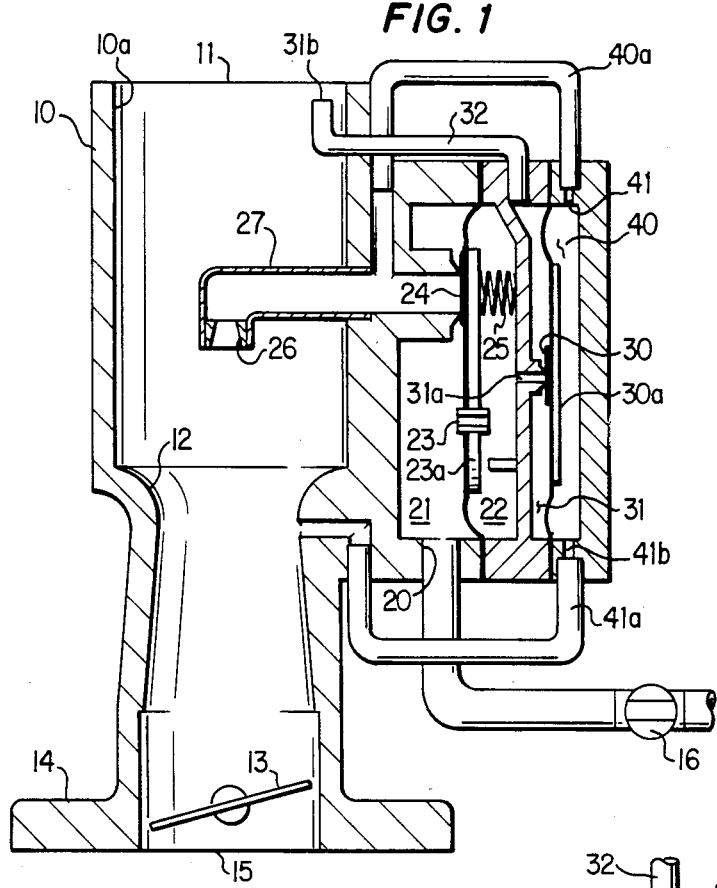
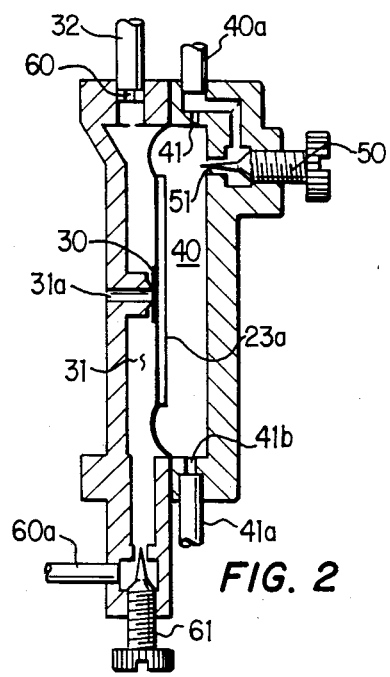
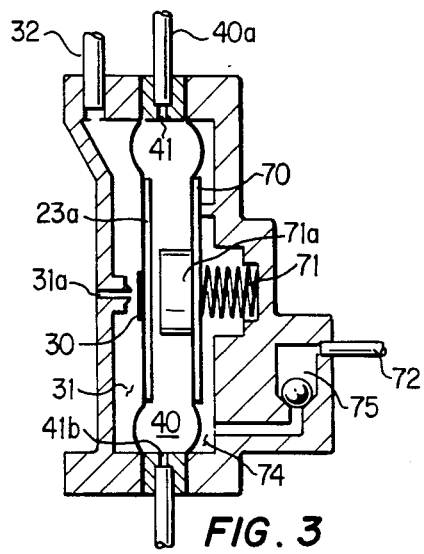

4,765,303

GASEOUS FUEL CHARGE FORMING DEVICE FOR INTERNAL COMBUSTION ENGINES

TECHNICAL FIELD

This invention relates to fuel systems for internal combustion engines, and more particularly to a fuel charge forming device for engines that operate on pressurized gaseous fuels.

BACKGROUND OF THE INVENTION

Internal combustion engines which burn pressurized gaseous fuel have long been used to power such devices as fork lifts operating inside buildings. Conventional fuel systems for such engines provide an enclosed gas chamber that has one movable side, i.e., a diaphragm, with the chamber being replenished by controlling a fuel valve to provide a fuel source that has a pressure slightly below atmospheric. There is communication provided between this chamber and the throat of a venturi in the induction system, with an orifice between the chamber and the venturi throat to control the fuel flow. The diaphragm is usually physically connected to the fuel valve through a lever. These systems require idle progression systems, and it has been found that conventional fuel systems do a less than optimal job of matching fuel supply to demand through the transition from idle to higher fuel demand conditions. The conventional fuel system also requires a starting assist system such as a choke or electric primer solenoid.

Another prior art gaseous fuel charge forming device uses opposing mechanically connected diaphragms of different areas with a fuel valve on the outer side of the smaller diaphragm. Negative pressure signals from a venturi are applied to a point between the two diaphragms, which unbalance the diaphragms in the direction of the smaller diaphragm to open a fuel valve by way of a lever. Fuel then flows across an orifice and thereby causes a back pressure to balance the diaphragm forces. This dual diaphragm prior art system is a positive feed device, such that fuel can be fed to the engine at a point upstream of the throttle valve other than the venturi throat. This dual mechanically-connected diaphragm fuel system requires an idle progression system adapted to the specific engine with which the system is used as well a starting system as in the single diaphragm system described above. This system is also expensive to build, due to the complication of the dual diaphragms and lever/valve arrangement, as well as the relatively large chamber (approximately 4.5" in diameter) required for housing the large diaphragm.

SUMMARY OF THE INVENTION

The device of the present invention forms a gaseous fuel charge by throttling a fuel valve in response to negative pressure signals from a venturi in the main air/fuel stream. This results in a positive fuel flow pressure which is directly related to the negative pressure signals from the venturi. Specifically, a fuel valve is slaved to a pilot charge flowing into a control chamber through a pilot valve. The pilot valve is throttled by a diaphragm having communication with both the venturi and a main fuel injection passageway.

BRIEF DESCRIPTION OF THE DRAWINGS

A more complete understanding of the invention and its advantages will be apparent from the Detailed Description taken in conjunction with the accompanying Drawings in which:

FIG. 1 is a schematic sectional view of the device to illustrate its functions.

FIG. 2 is a schematic sectional view of the control chamber with an idle trim and main fuel trim.

FIG. 3 is a schematic sectional view of the control chamber with a vacuum responsive device across a check valve to close the pilot valve.

DETAILED DESCRIPTION OF THE PREFERRED EMBODIMENT

Referring initially to FIG. 1, the device of the present invention includes a body 10 having a bore 10a with an air inlet 11, a venturi 12, a throttle valve 13, and a mounting flange 14 about a fuel charge outlet 15. Pressurized gaseous fuel is supplied by way of a vacuum switch controlled solenoid valve 16 to fuel inlet 20 and unmetered fuel chambers 21 and 22. Communication is formed between chambers 21 and 22 by fuel valve pilot orifice 23 in fuel valve diaphragm 23a. Fuel valve diaphragm 23a separates chambers 21 and 22. The fuel valve 24 is mounted on fuel valve diaphragm 23a, is closed with spring 25, and is back seated so that the fuel pressure closes it. The pilot valve 30 mounted on pilot valve diaphragm 30a opens communication with chamber 22 and vent chamber 31 through pilot valve orifice 31a. Vent chamber 31 communicates with the air inlet 11 at vent 31b through passage 32. The fuel valve 24 when open feeds main fuel orifice 26 through fuel injection passageway 27.

Passageway 27 communicates with control chamber 40 through passageway 40a across fuel control orifice 41. Control chamber 40 also communicates with venturi 12 thorugh passageway 41a across air control orifice 41b. Pilot valve diaphragm 30a separates vent chamber 31 and control chamber 40.

In operation, the device uses negative pressure signals from the venturi 12 to throttle the fuel valve 24 and provide a fuel delivery that has a positive pressure and therefore can be fed anywhere in the air stream up stream of the throttle valve 13. The means of controlling the fuel pressure includes control chamber 40 having communication with the venturi 12 across air control orifice 41b and also having communication across fuel control orifice 41 with the fuel injection passageway 27 downstream of the fuel valve 24 but upstream of the main fuel orifice 26. Control chamber 40 is closed on one side with the pilot valve diaphragm 30a, which indirectly opens and properly positions the fuel valve 24 by throttling a small pilot fuel charge through pilot valve 30. The fuel pressure acting on the pilot valve diaphragm 30a sets up a normally open device and requires a very slight pressure in control chamber 40 to throttle the fuel valve 24 (a few thousandths of an inch of water) and this becomes the normal control chamber pressure. With no air movement through venturi 12, the pressure difference across the air control orifice 41b is the few thousandths of an inch of water required to throttle the fuel valve 24, which is provided by fuel across the fuel control orifice 41. The fuel feed pressure thus becomes the pressure difference across the fuel control orifice 41, plus the normal control chamber pressure. The control chamber is evacuated by the negative pressure signals from venturi 12. Since the control chamber pressure is constant at a few thousandths of an inch of water, the fuel velocity across the air control orifice 41b is directly related to the air velocity through venturi 12. The control chamber is replenished by the fuel across fuel control orifice 41. The fuel delivery pressure is determined by the related sizes of the controlling orifices, such that the smaller the fuel orifice 41, the greater the fuel pressure.

Upon the initial demand for fuel-engine cranking-solenoid 16 is opened allowing gaseous fuel to enter at fuel inlet 20 pressurizing chambers 21 and 22. The pressure in chamber 22, however, will be less than the pressure in chamber 21, because the pilot valve 30 will be open allowing the fuel valve diaphragm 23a to unseat fuel valve 24 by a cocking motion to pressurize passage 27 and control chamber 40 through fuel control orifice 41. The fuel valve 24 continues to open until the fuel flowing across fuel control orifice 41 produces ample back pressure as it flows across the air control orifice 41b to raise the pressure in control chamber 40, thereby moving the pilot valve diaphragm 30a inward to throttle pilot valve 30, which positions the fuel valve 24 by controlling the pressure relation in chambers 21 and 22 across fuel valve orifice 23. The pressure difference across the pilot valve diaphragm 30a is a function of the area of pilot valve orifice 31a times the system pressure over the area of pilot valve diaphragm 30a. This pressure is referred to as the control chamber pressure and is not related to the quantity of air/fuel charge flowing. Since the control chamber pressure is constant, an increase in air/fuel charge increases the vacuum at venturi 12 which increases the pressure difference across air control orifice 41b. More fuel flow through control chamber 40 is required, which must be supplied through fuel control orifice 41 by a pressure increase in passageways 27 and 40a. The velocities at venturi 12 and air control orifice 41b are always related, and, disregarding the control chamber pressure and the differences in specific gravities, the velocities should be considered equal. The relationship of velocities through orifices 41b and 41 is a simple function of areas, therefore the fuel pressure feeding the main fuel orifice 26 is the area of air control orifice 41b over the area of the control orifice 41 squared. Therefore the sizing of main fuel orifice 26 is a function of area ratios of orifices 41b and 41 and the area of venturi 12.

Referring now to FIG. 2, control chamber 40 communicates with a load trim screw 50 through passage 51 that decreases the pressure in passageway 40a by increasing the area of communication between passageway 40a and control chamber 40 to provide a means of trimming the air/fuel charge to the lean side. Many applications will not require an idle trim, however, the high performance operations will need a trim. Trim is provided adding a restricting orifice 60 in vent passage 32 to raise the control chamber pressure to a level that is not detrimental to the slow speed maximum power mode, and then using a vacuum source at 60a across idle trim screw 61 to lower the control chamber pressure for the proper idle trim.

Referring now to FIG. 3, a vacuum responsive diaphragm 70 is urged inwardly by spring 71 to contact the pilot valve diaphragm 30a at contact 71a. Pilot valve 30 is thereby closed to prevent fuel flow through fuel valve 24. Vacuum is provided at passageway 72 from either the engine's intake manifold (engines with 3 or more cylinders) or from the crankcase (engines of 1 or 2 cylinders). Vacuum chamber 74 is evacuated across a check valve 75 to prevent pumping the control chamber 40 with the intake pulses at high loads or the crank case pulses of 1 and 2 cylinder engines at all conditions.

Whereas the present invention has been described with respect to a specific embodiment thereof, it will be understood that various changes and modifications will be suggested to one skilled in the art and it is intended to encompass such changes and modifications as fall within the scope of the appended claims.

I claim:

1. A gaseous fuel charge forming device, comprising:
    a body having internal walls defining a bore;
    an air inlet at one end of the bore to receive air;
    a fuel charge outlet at the other end of the bore adapted for attachment to the induction system of an internal combustion engine;
    a throttling valve located in the bore between the air inlet and the fuel charge outlet;
    the bore including a venturi section located between the throttling valve and the air inlet;
    a fuel injection passageway having an orifice disposed for injection of gaseous fuel into the bore between the throttling valve and the air inlet;
    a fuel valve connected to the fuel injection passageway to control flow from a source of pressurized gaseous fuel through the fuel injection passageway to the orifice; and
    control means for controlling the flow rate of fuel through the fuel valve being responsive to negative pressure signals from the venturi section, such that increasingly negative pressure signals from the venturi section cause correspondingly increased flow rates of fuel through the fuel valve.

2. The device of claim 1 wherein the fuel valve comprises a fuel valve diaphragm having first and second sides and sealing means connected to the first side the fuel valve diaphragm for varying the opening of the fuel valve with movements of the diaphragm.

3. The device of claim 2 wherein the fuel valve diaphragm includes a pilot orifice for communication between the first and second sides of the fuel valve diaphragm, and the control means includes pilot means responsive to a pilot fuel charge flowing through the pilot orifice to a vent, the opening of the fuel valve being controlled in response to the pilot fuel charge flow.

4. The device of claim 3 further comprising a pilot valve for controlling the pilot fuel charge flow in response to negative pressure signals from the venturi.

5. The device of claim 4 wherein the pilot valve includes a pilot valve diaphragm having first and second sides, the first side of the pilot valve diaphragm being in communication with the venturi section and also in communication with the fuel injection passageway, and the second side of the pilot valve diaphragm being in communication with the pilot valve and the vent.

6. The device of claim 5 further comprising an idle trim passageway between the second side of the pilot valve diaphragm and the bore downstream of the throttling valve and an adjustable restriction disposed in the idle trim passageway.

7. The device of claim 5 further comprising an air fuel trim passageway between the first side of the pilot valve diaphragm and the fuel injection passageway, and an adjustable restriction disposed in the air fuel trim passageway.

8. The device of claim 5 further comprising a vacuum responsive diaphragm mounted opposite the first side of the pilot valve diaphragm, means for biasing the vacuum responsive diaphragm towards the first side of the pilot valve diaphragm to contact the pilot valve diaphragm and close the pilot valve, and a vacuum passageway in communication with a source of engine vacuum and in communication with the vacuum responsive diaphragm to oppose the means for biasing, such that when the engine is at rest the pilot valve is closed and the pilot valve is free to open when the engine is in operation.

9. The device of claim 8 further comprising a check valve in the vacuum passageway opposing flow through the vacuum passageway towards the vacuum responsive diaphragm, such that the closing of the pilot valve is retarded.

10. A fuel charge forming device for an internal combustion engine using pressurized gaseous fuel and having an induction manifold, comprising:
   a fuel valve mounted on a fuel valve diaphragm and located between a source of pressurized gaseous fuel and a fuel feed passageway, the fuel feed passageway ending at a fuel injection orifice located in a bore connected to the induction manifold; and
   a pilot valve for throttling a pilot charge flowing through an opening in the fuel valve diaphragm, the pilot valve being responsive to engine demand signals to control the pilot charge and thereby control the fuel valve.

11. The device of claim 10 wherein the pilot valve is mounted on one side of a pilot valve diaphragm, and the other side of the pilot valve diaphragm defines a movable side of a control chamber, the control chamber being in communication with a source of vacuum related to engine demand and also being in communication with the fuel feed passageway between the fuel valve and the fuel injection orifice.

* * * * *